United States Patent
Cheng et al.

(10) Patent No.: US 11,493,325 B2
(45) Date of Patent: Nov. 8, 2022

(54) DEVICE AND METHOD FOR INTERFEROMETRIC MEASUREMENT OF A TWO OR THREE DIMENSIONAL TRANSLATION OF AN OBJECT

(71) Applicant: Nederlandse Organisatie voor toegepast-natuurwetenschappelijk onderzoek TNO, 's-Gravenhage (NL)

(72) Inventors: Lun Kai Cheng, Krimpen aan den IJssel (NL); Arno Willem Frederik Volker, Delft (NL); Peter Martijn Toet, Woerden (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/270,376

(22) PCT Filed: Aug. 26, 2019

(86) PCT No.: PCT/NL2019/050546
§ 371 (c)(1),
(2) Date: Feb. 22, 2021

(87) PCT Pub. No.: WO2020/040640
PCT Pub. Date: Feb. 27, 2020

(65) Prior Publication Data
US 2021/0389118 A1 Dec. 16, 2021

(30) Foreign Application Priority Data
Aug. 24, 2018 (EP) ..................................... 18190803

(51) Int. Cl.
*G01B 9/02015* (2022.01)
*G01B 11/00* (2006.01)
(Continued)

(52) U.S. Cl.
CPC ........ *G01B 11/002* (2013.01); *G01B 9/02001* (2013.01); *G01B 9/02027* (2013.01);
(Continued)

(58) Field of Classification Search
CPC .............. G01B 11/002; G01B 11/2441; G01B 9/02001; G01B 9/02027; G01B 9/02028;
(Continued)

(56) References Cited

U.S. PATENT DOCUMENTS

| 5,410,410 A | 4/1995 | Yamazaki et al. |
| 2005/0275846 A1 | 12/2005 | Cheng |

(Continued)

FOREIGN PATENT DOCUMENTS

| EP | 1111472 A2 | 6/2001 |
| EP | 2236978 A1 | 10/2010 |
| WO | WO 2014/171825 A1 | 10/2014 |

OTHER PUBLICATIONS

European Patent Office, International Search Report in corresponding International Application No. PCT/NL2019/050546, dated Nov. 25, 2019 (3 pages).

*Primary Examiner* — Jonathan M Hansen
(74) *Attorney, Agent, or Firm* — Leydig, Voit & Mayer, Ltd.

(57) ABSTRACT

Translations of an object in a plurality of different spatial directions are measured using a plurality of interferometers to detect interference with light that has been reflected from a diffusively reflective surface, preferably using diffuse reflection from the same planar surface to measure in each of the different spatial directions. At least the interferometers that measure translation in directions that are not perpendicular to the surface each comprises a single mode fiber and a collimator configured to transmit the outgoing light to the object successively through the single mode fiber and the (Continued)

collimator, and to collect reflection into the single mode fiber with the collimator both along a same beam direction. It has been found that, when reflection of a beam with a beam direction at an oblique angle to a diffusively reflective surface is used, the interference resulting from translation of the object is due substantially only to translation in the beam direction.

18 Claims, 2 Drawing Sheets

(51) Int. Cl.
  *G01B 9/02001* (2022.01)
  *G01B 9/02* (2022.01)
(52) U.S. Cl.
  CPC ..... *G01B 9/02028* (2013.01); *G01B 9/02049* (2013.01); *G01B 9/02094* (2013.01); *G01B 2290/45* (2013.01)

(58) Field of Classification Search
  CPC ............ G01B 9/02049; G01B 9/02094; G01B 2290/45; G01B 9/02
  See application file for complete search history.

(56) References Cited

U.S. PATENT DOCUMENTS

| | | |
|---|---|---|
| 2006/0132790 A1 | 6/2006 | Gutin |
| 2014/0313477 A1 | 10/2014 | Raymond et al. |
| 2016/0178345 A1* | 6/2016 | Kilpatrick .............. G01B 11/14 356/482 |
| 2017/0123052 A1* | 5/2017 | Hinderling .............. G01S 17/42 |
| 2017/0276471 A1* | 9/2017 | Jiang .................. G01B 9/02091 |
| 2019/0056214 A1* | 2/2019 | Everett .............. G01B 9/02017 |

* cited by examiner

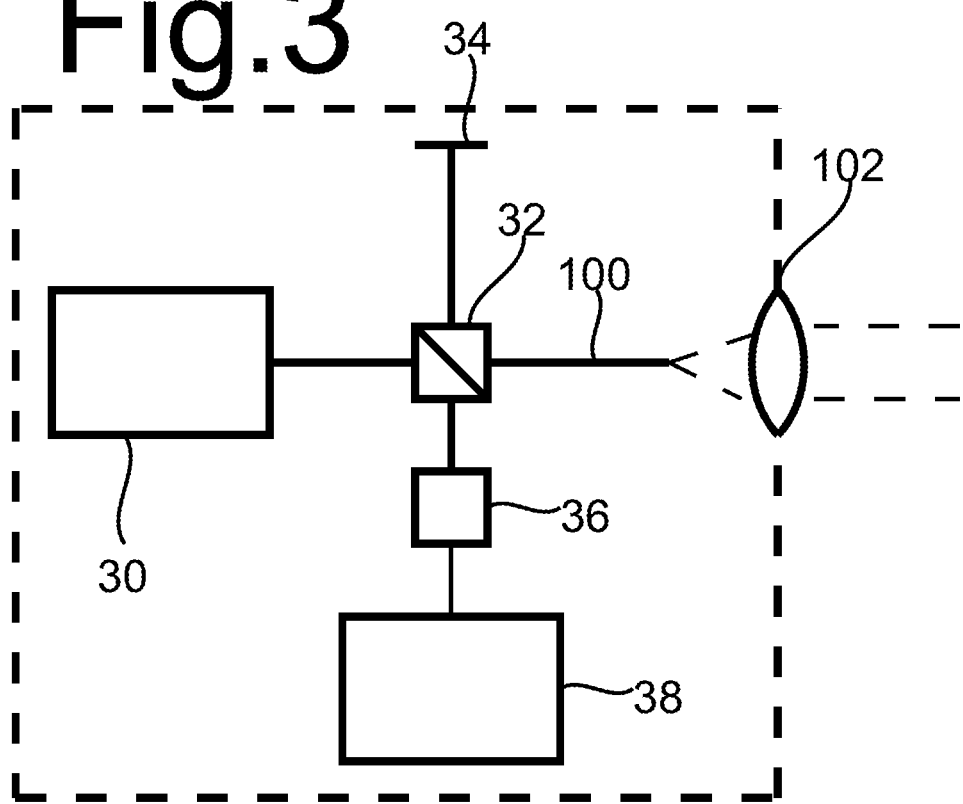

DEVICE AND METHOD FOR INTERFEROMETRIC MEASUREMENT OF A TWO OR THREE DIMENSIONAL TRANSLATION OF AN OBJECT

CROSS-REFERENCE TO RELATED APPLICATIONS

This patent application is a U.S. National Phase of PCT International Application No. PCT/NL2019/050546, filed Aug. 26, 2019, which claims priority to European Application No. 18190803.9 filed Aug. 24, 2018, which are both expressly incorporated by reference in their entireties, including any references contained therein.

FIELD OF THE INVENTION

The invention relates to a device and method for interferometric measurement of a two or three dimensional translation of an object.

BACKGROUND

Interferometric distance variation measurement is known per se. In an interferometer, this involves mixing light that has travelled over the variable distance with light that has travelled over a reference distance, and measuring a time dependent phase variation of the light that has travelled over the variable distance, usually from periodic intensity variation of the mixed signal in the interferometer. Usually, the variable distance is a distance back and forth along an optical path between the interferometer and a mirror surface of an object that reflects the light back along the optical path. To measure distance variation two or three dimensional displacement of an object, a plurality of such interferometers can be used, using reflection with corresponding, differently oriented mirrors surfaces on the object.

Interferometry can also be used for object shape measurement, for example by measuring distance variation when the object is displaced in directions perpendicular to the optical path. US2016178345 discloses performing object vibration measurements in this way. For objects with reflective surfaces this possibility is limited to measurement of that shape by reflection from surfaces that are more or less perpendicular to the optical path along which the beam is directed, or paths along which different beams are directed.

Accurate displacement measurement using diffusely reflective surfaces is more difficult. Speckle interferometry is known, which uses changes of speckle patterns to detect motion. But this generally produces mainly qualitative information.

EP2236978 discloses object shape measurements using interferometry with light reflected from a diffusely reflective surface. The document discloses that a single mode optical fiber makes it possible to measure optical path length changes interferometrically even if the reflected light is diffusely reflected at the surface. EP2236978 shows that, when object movement is in the direction of the beam, the surface need not be oriented perpendicular to the optical path back and forth to the interferometer in order to measure distance changes in the direction of the beam.

US201702767471 discloses an improvement of optical coherence tomography (OCT). Conventional OCT is a technique that distinguishes reflections from different depths within an object that diffusively transmits light. Light with a short coherence length is used. The intensity of reflections at different depths within the object are distinguished by using interference intensity measurements obtained with different interferometer reference path lengths to identify the position of the target at which the interference occurs. In other OCT systems time encoded signals are used to distinguish different depths.

Thus OCT makes it possible to obtain a set of interference intensity measurement and to associate different intensity measurements with different depths within the object, e.g. by changing the interferometer path length and identifying the path length at which interference occurs. This may be contrasted with interferometric distance measurement using specular reflection from the surface of an object, wherein the same intensity is continuously reflected from the surface and distance changes are essentially determined from phase changes of the reflection, usually measured by means of periodic intensity variation. Also, because reflections from different sub-surface depths within the object are used in OCT, it does not matter whether the object surface is perpendicular to the beam.

US201702767471 applies OCT to coordinate measuring machines for industrial applications, using a control loop to control beam focusing in correspondence with the reference path length.

US2006132790 discloses OCT using multiple fibers, which emit light beams derived from the same light source that overlap on the object. This causes an interference pattern in the overlap, of which the position can be scanned by changing the relative phase delay between the beams. Intensity modulation of the different beams at different frequencies can be used to distinguish the interference.

US2014313477 discloses OCT with multiple beams at different angles to each other to evaluate the eye of a patient.

US2016178345 discloses conformal imaging vibrometry. An object is illuminated with multiple laser beams whose directions conform to the local normal axis of the surface at the locations where the beams are incident on the surface. Interferometry is used to measure the Doppler frequency shift of the light which is caused by the object vibration speed at these locations.

SUMMARY

Among others it is an object to a device and method for interferometric measurement of a two or three dimensional translation of an object.

A method is provided for optically measuring translations of an object in a plurality of different spatial directions, comprising
using a plurality of interferometers, each configured to measure a respective phase response to a respective translation component of the object, from interference with a respective reflection of outgoing light transmitted to the object along a respective different spatial direction; wherein at least one of the interferometers comprises a single mode fiber and a collimator configured to transmit the outgoing light to the object successively through the single mode fiber and the collimator, and to collect reflection into the single mode fiber with the collimator both along a same beam direction, for determining the respective phase response relative to a reference in the interferometer, in which method
the collimator is used to expand a beam width of light from the single mode fiber and direct a collimated expanded beam of the outgoing light non-orthogonally at a diffusely reflective surface part of the object, from which the reflection is collected or at a part of the object covered with a plurality of retro-reflective cells, from which the reflection is collected.

The reference for the phase may have a fixed phase relation to the outgoing light that need not be scanned to determine the object translation. The reference for the phase may be provided by means of reference light obtained from the same light source as the outgoing light, by passing the reference light through a reference path before detection of a mix of the reflected light and the reference light. The length of the reference path need not be scanned to determine the object translation.

It has been found that, when a collimator is used to form a collimated beam of outgoing light from a single mode fiber and to collect diffusively reflected light back into the single mode fiber, the collimated beam being directed non-orthogonally at a diffusely reflective surface, interference with the diffusively reflected light selectively measures a translation component in the direction along the collimated beam Non-orthogonal means that, if the surface would produce only specular reflection, no intensity would be collected into the single mode fiber. But even if there where such an intensity, Non-orthogonality would have the effect that a translation component perpendicular to the beam direction would affect the phase changes that are used to measure translation. However, if an expanded collimated beam is used on a diffusely reflecting non-orthogonal surface, the effect of translation components perpendicular to the beam direction on the wave vector of the reflected light is a small variation that depends unpredictably on the object. This presents at most a small amount of noise when the interference is used to measure the translation component along the beam direction. In proportion to the effect of translation in the beam direction the effect of translation perpendicular to the beam direction is effectively filtered out, independent of the orientation of the surface relative to the beam direction, when a collimated beam of outgoing light from a single mode fiber is used.

Therefore the translation of a object need not be constrained to a single direction to avoid disturbance, so that the diffuse reflection can be used as part of 2d or 3d interferometric translation measurement. Unlike interferometry using specular reflection, no specific relation between the direction of the beam and the diffusively reflecting surface is needed. This makes it possible to measure simultaneous translation components in different directions using reflections from a same surface part. Thus, limited access to the object or object part of which the translation has to be measured does not need to prevent the measurements. The beams from different directions may overlap on the surface part, which may be a planar surface but for surface roughness that results in diffusive reflection. All of the object may be diffusely reflective, but it suffices that a single surface part is diffusely reflective.

In an embodiment the diffusive reflection is obtained selectively from a surface part of the object that is smaller than the beam diameter, so that the same diffusively reflective surface part can remain within the beam during translation. This can be used to reduce the noise due to translation components in directions perpendicular to the beam direction. Such selective reflection can be realized when the diffusively reflective surface part is surrounded by a non-reflective surface area, or an only specularly reflective area, or is formed by a facet of the object surrounded by differently oriented faces that do not reflect back the beams.

BRIEF DESCRIPTION OF THE DRAWING

These and other objects and advantageous aspects will become apparent from a description of exemplary embodiments with reference to the following figures.

FIG. 3 illustrates an embodiment using a Michelson type interferometer

DETAILED DESCRIPTION OF EXEMPLARY EMBODIMENTS

Figure 1:
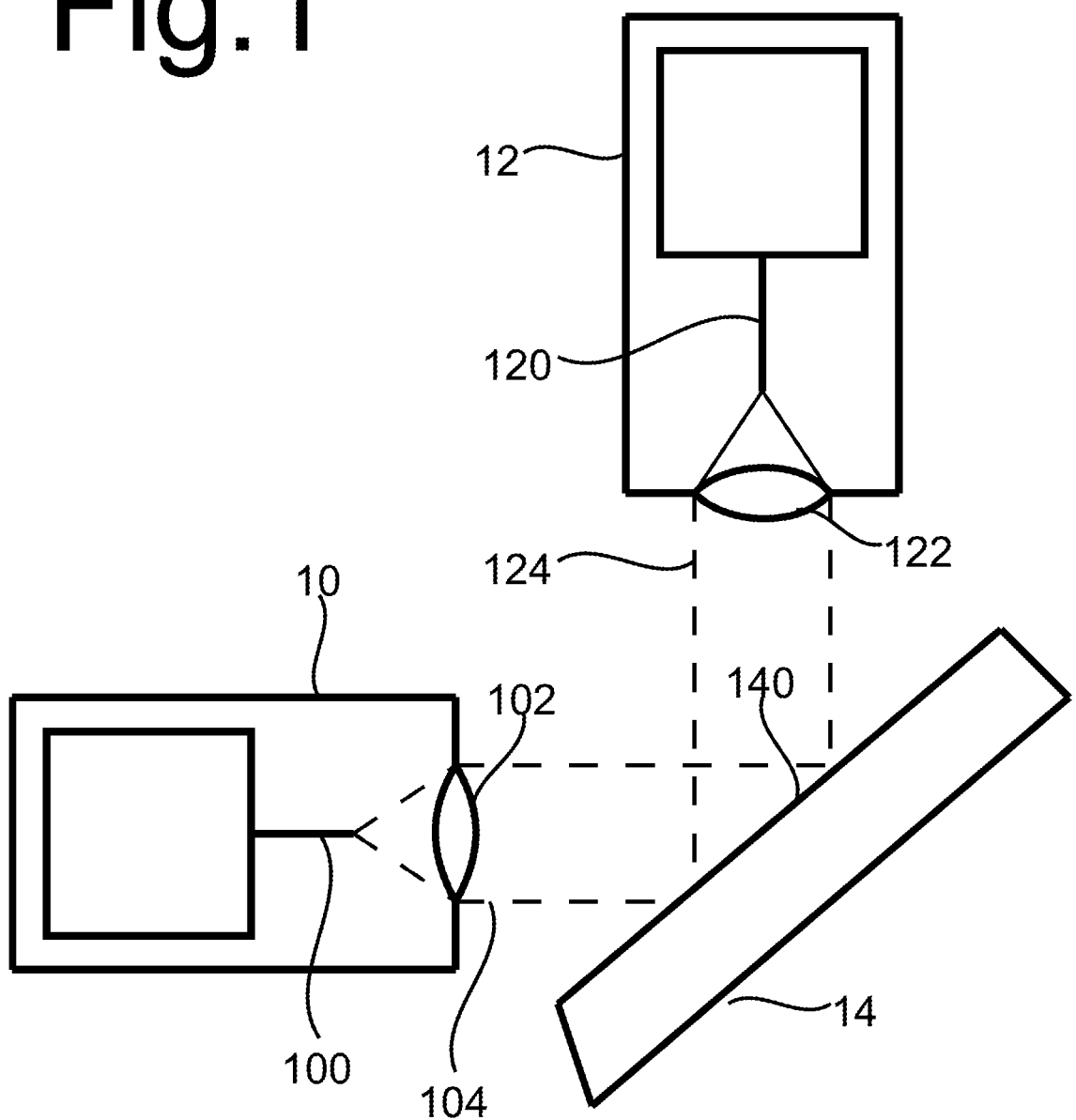
FIG. 1 shows an interferometric measurement setup

FIG. 1 shows an interferometric measurement system with a first and second interferometer 10, 12 used to measure translation of an object 14, wherein use is made of diffuse reflection of collimated beams from different directions. The system will be described for use to measure translation using a surface or surfaces of an object that does not deform or rotate during translation. But it should be noted that this object may be part of a larger object (not shown) with other parts that deform, rotate or translate relative to object 14. First and second interferometer 10, 12, each have a measurement path that comprise a single mode fiber 100, 120, and a collimator 102, 122 to collimate outgoing light from single mode fiber 100, 120 into collimated beams 104, 124. In the figure single lenses 102, 122 are shown as collimators, but it should be appreciated that instead multi lens optical system can be used as a collimator. Single mode fiber 100, 120, and collimator 102, 122 in each of first and second interferometer 10, 12 are positioned relative to object 14 so that there is a non-zero angle between the collimated beams 104, 124 from different ones of collimators 102, 122. Furthermore, the collimated beams 104, 124 are directed to the same surface part of object 14, at different non-zero angles with the normal vector to this surface part of object 14. Preferably, the collimated beams 104, 124 do not have angles of incidence to the object surface wherein specular reflection of one beam would result in a reflected beam along the beam direction of the other beam. The surface part 140 of object 14 is perpendicular to neither of the collimated beams 104, 124. Preferably, as shown, the collimated beams 104, 124 overlap in an area 140 on the surface part of object 14.

As is known per se, a collimated beam is a beam with a flat wave front. In a perfect collimated beam the beam does not diverge or converge at all. With such a perfect collimated beam measurements over an infinite range of translations along the beam direction would be possible. But in practice beam is referred to as a collimated beam also if the wave front is curved or the beam width diverges or converges, when the curvature and convergence is not significant in the sense that it does not significantly affect the translation measurement (e.g. if it leads to less than ten percent deviation in the range of allowed translations). A beam may be used that can be modeled by a Gaussian beam propagation model.

Use of first and second interferometer 10, 12 makes it possible to perform 2D translation measurements. In a further embodiment (not shown) the interferometric measurement system comprises a third interferometer comprising a single mode fiber and a collimator to collimate outgoing light from the single mode fiber of the third interferometer. This makes it possible to perform 3D translation measurements. In this embodiment the single mode fiber and collimator of the third interferometer are positioned so that the direction of the collimated beam from the third interferometer has non-zero angles with the directions of the collimated beam from the first and second interferometer 10, 12, and non-zero angle with a virtual plane that is parallel to the directions of the collimated beam from the first and second interferometer 10, 12.

Furthermore, the single mode fiber and collimator of the third interferometer are positioned so that the collimated beam from the third interferometer intersects the same surface part of object 14 as the beams 104, 124 from first and second interferometer 10, 12 at non-zero angle. Preferably all beams overlap in the same area 140 of the surface part of object 14. Mutatis mutandis, everything that will be described for first and second interferometer 10, 12 and their combination applies to the third interferometer and the combination of the first, second and third interferometer 10, 12 as well.

The surface part of object 14 is diffusively reflective at least where the collimated beams intersect the surface part.

Figure 2:
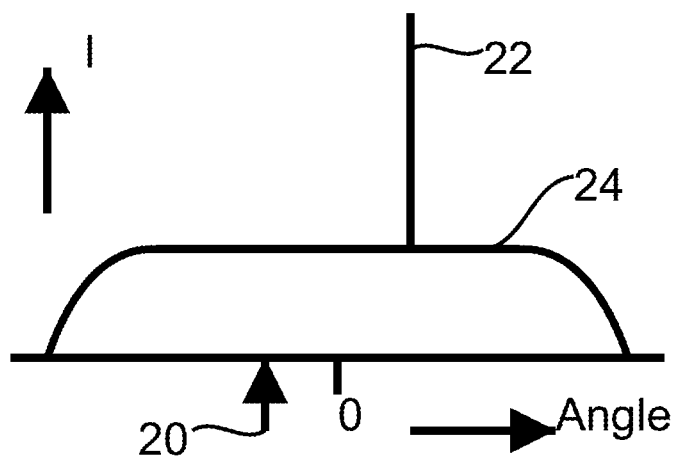
FIG. 2 qualitatively illustrates diffuse reflection properties

FIG. 2 qualitatively illustrates reflection properties of a diffusively reflective surface part in terms of reflection intensity as a function of reflection angle in a plane that contains the incoming beam direction and is perpendicular to the surface part of object 14. The case is illustrated wherein the incoming beam is not incident normal to the surface part of the object.

The angle of incidence of the incoming beam is indicated by an arrow 20. For reference, a sharp specular reflection peak 22 is indicated at the angle of specular reflection (satisfying the well known angle of incidence equal angle of reflection condition for reflection from mirror surfaces). In the case of an ideally diffusely reflective surface part, reflection peak 22 is absent. Graph 24 shows the intensity of diffuse reflection of the diffusively reflective surface part as a function of reflection angle. In contrast to a purely specularly reflective surface part, the diffusively reflective surface part has non-zero reflection intensity also for reflection angles other than angle of specular reflection. For a natural diffusely reflective surface part, the intensity is non-zero over a continuous range of reflection angles, e.g. due to microscopic surface roughness with random surface height variations. Although a flat angle dependence is shown, it should be appreciated that in practice a more variable dependent may occur, e.g. with a continuous broad peak around the specular reflection angle of the specular reflection peak 22.

Due to the diffuse reflection the reflected light from the surface part no longer forms a collimated beam. As may be noted, graph 24 includes reflection intensity at in the direction 20 of the incoming beam, even though the incoming beam is not incident normal to the overall surface part of the object. With a diffusively reflective surface part, this will be the case for both the collimated beams 104, 124. The collimator 102, 122 selectively focusses one direction component of the light onto the tip of single mode fiber 100, 120, notably the direction component in the direction of the original collimated beam.

In principle, the application of interferometry to reflected light from a diffusely reflective surface part does not provide accurate information about the position of the surface part. This is particular so when the surface part is tilted with respect to the direction to the light source (when the normal vector to the surface part is not parallel to that direction) and the beam width is larger than the desired position accuracy. Interferometers, like the Michelson interferometer, that rely on a mirror to return reflected light through the same optical path as transmitted outgoing light for measuring object displacement in the direction of the beam, would not even work when the reflected surface part is tilted.

However, it has been found that, when a single mode fiber 100, 120 and a collimator 102, 122 are used, components of the movements of the tilted surface part can be resolved accurately by means of interferometry. This is based on the fact that a combination of a single mode fiber and a collimator can be used to perform selective collection reflection from the same reflective surface patches independent of translation. The combination of the single mode fiber and the collimator in transmission provide well-defined and stable phase differences relation between reflection from the different patches. In reflection, the single mode fiber receives and filters the light and returns the received and filtered light to an interferometer system for phase measurement, of the phase (e.g. in the form of phase changes) of the received and filtered light relative to reference light in the interferometer. As a result, the phase of the reflection changes coherently on translation, even though the phase of the reflection has no relation to the absolute position.

This will be illustrated by means of a theoretical model for diffusive reflection. In this model the diffusively reflective surface part of object 14 is as an ensemble of small reflective patches on the surface part of the object, wherein the patches have a random distribution of reflection patterns, such as specular reflection patterns corresponding to randomly distributed patch orientations.

This results in the non-zero value of graph 24 over a continuous range of angles. When the beam is sufficiently wide, there will always be a plurality of patches in the beam width that reflect back light from the beam at any given reflection angle for which the random distribution of reflection patterns allows reflections. The phase of the returned light in single mode fiber 100, 120 varies linearly with position in single mode fiber 100, 120. The complex wave vector that represents the phase and amplitude of the returned light at an arbitrarily selectable reference point along single mode fiber 100, 120 is a complex sum of the wave vectors of the reflections that are returned into the single mode fiber 100, 120 by collimator 102, 122 from different patches. Use of a single mode fiber ensures that the beam is coherent on the object, in the sense that a coherent wave front is defined across the beam width. The phases of the reflections of this coherent wave front from different patches are uncorrelated due to the random roughness of the diffuse surface. When the normal to the surface part of object 14 is not perpendicular to the direction of the collimated beam, the tilted surface part converts the random distribution of the position of the reflecting patches in the direction perpendicular to the beam direction into a random distribution of phase delays in the tilt direction. Surface roughness also makes the phases uncorrelated.

As a result, the complex wave vector of at the reference point along the single mode fiber is a stochastic quantity, but will remain time constant for a given object that is lighted in a time constant way. For a large beam width, the probability density of the resulting complex wave vector at the reference point along the single mode fiber 100, 120 approximates a normal distribution. Absent specular reflection, the mean statistical value of the complex wave vector in single mode fiber 100, 120 is zero and its variance is proportional to the size of the beam. However, the power is the square of the field. Due to the size of the core of the single mode fiber, the optical power coupled into the SM fiber will be non-zero. The expectation value of the amplitude of the wave vector in the single mode fiber 100, 120 increases with the square root of the beam size.

As long as the position and orientation of the object relative to the beam remains the same, the wave vector in the single mode fiber 100, 120. Also, when object 14 is translated without rotating object 14, the same surface part patches will keep reflecting the light in the same direction. The single mode fiber ensures that the beam coupled into the fiber has a coherent wave front and acts as a mode and wave front filter for the reflected light passing only a wave front and intensity distribution matching with the fundamental mode of the single mode fiber. This results in a reflected beam with a phase which is directly related to the phase of the light source.

Collimator 102, 122 ensures that only the light from the same patches will return to the fiber independent of the translation in the beam direction. In the case of translations along the direction of the collimated beam the optical path length to all patches will change by the same amount. In the case of translations in directions perpendicularly to the direction of the collimated beam the optical path lengths stay the same, since the path length through a collimator is not dependent on translation perpendicularly to the beam direction.

However, translation perpendicular to the beam direction may affect the phase and amplitude of the collected reflected light in single mode fiber 100, 120 in spite of the constant path lengths. This may be the case for example if the beam has an intensity profile wherein the intensity varies with position in a direction perpendicular to the direction of the collimated beam. In that case the phase of the combination light from the patches may change because the reflected intensity from patches at different positions may change differently during the translation.

Due to the lack of phase correlation between reflection from different patches, the changes in the wave vector in single mode fiber 100, 120 due to perpendicular translation are random. This will contribute to some noise of the measurement.

During movement, the effect of the translation component of the object in the beam direction shows up as time dependent rotation of the wave vector in single mode fiber 100, 120. The effect of the translation component of the object perpendicular to the beam direction is expected to show up as a small time dependent noise in the wave vector in single mode fiber 100, 120. However, the effect of this noise is much smaller than the rotation, and moreover it can be reduced by design measures. The correlation $R(r, r')=\langle W(r)W(r')\rangle$ between refection wave vectors $W(r)$ and $W(r')$ measured with different beam positions r, r' perpendicular to the beam direction can be modelled with $$R(r,r')=\text{Integral over } q,q' \text{ of } B(r-q)Ro(q,q')B(r'-q')$$

Herein B is the beam intensity profile as a function of spatial position, wherein r and r' are different central positions of the beam, and Ro(q, q') is the correlation between the reflection coefficient of patches at positions q, q' (if the distribution of patches is homogeneous, Ro is a function of q–q'). When the correlation Ro between the reflection coefficient of patches decays much more rapidly with the distance between q and q' than the beam intensity profile B, the correlation varies substantially as an auto-convolution of the beam intensity profile.

As a result, the spatial derivative of the correlation with respect to translation perpendicularly to the beam direction is inversely proportional to twice the beam width BW, whereas the spatial derivative of the reflection coefficient with respect to translation along the beam direction is inversely proportional to the wavelength. Therefore, the signal to noise ratio is of the order wavelength/BW, which is very small.

More specifically, the expectation value of the complex wave vector W in single mode fiber 100, 120 with the beam at central position r and the surface at position z along the beam direction, given the wave vector W' with the beam at central position r' and surface position z' is modelled by $$W=W'^{*}\exp(ik(z-z'))R(r,r')/R(r',r')$$

Herein k is two PI divided by the wavelength. The actual complex wave vector is a sum of this predictable expectation value and a term that differs unpredictably for different objects. Only the variance (statistical root mean square) of this term can be computed, as the upper left component of the inverse of the matrix ((R(r,r), R(r, r')), (R(r',r), R(r',r'))), that is, for a homogeneous surface with R(r,r')=R(r-r')

$$\text{Variance}=R(0)-R(r-r')^2/R(0)$$

The fact that the variance is zero when r=r' corresponds to the fact that W'=W when r=r'. When r is not equal r', the variance becomes positive. The derivative of R(r-r') at r=r' is also zero. As noted, the correlation R(r-r') varies a spatial scale of twice the beam width. Therefore, as long as the displacement r-r' of the beam in the direction perpendicular to the beam direction is much smaller than the beam width, the variance remains close to zero. For small displacements r-r' the expectation value of the complex wave vector can be expressed in terms of its derivative with respect to position $$dW/dr=2ikeW$$

Where e is the unit vector in the beam direction. As for arbitrary displacements, the actual complex wave vector for small displacements dr equals the expectation value dr*dW/dr plus a term that differs unpredictably for different objects. The variance of this term grows with $dr^2$ in inverse proportion to the beam width, introducing noise of the order of dr*k/BW, which is small as long as the beam width is much larger than the wavelength.

Thus, the phase of the combination of light from the patches that reflect back in the direction of the collimated beam will change substantially only in proportion to the ratio of the translation component in the direction of the collimated beam. Therefore, the interferometer signal can be used to measure translations along the direction of the collimated beam of the interferometer even when the translation is not entirely in the direction of the beam.

The noise due to translation perpendicularly to the beam direction is negligible when measurements obtained with translations perpendicular to the beam direction are used that are much smaller than the beam width. Optionally, the noise due to larger translations perpendicularly to the beam direction can be reduced by limiting reflection from the object to a surface part that is smaller than cross-section of the beam and remains within the beam during translation. In this way the intensity of the light on the patches will not, or only slowly change during translation, when the beam has constant, or slowly varying intensity as a function of position in the directions perpendicular to the beam. This prevents or reduces the noise. The reflection from the object can be limited by using an object surface that is diffusively reflective only in a limited area that lies entirely within the beam, and non-reflective or only specularly reflective in an area surrounding this limited area. The reflection from the object can also be limited by using a faceted object, and using reflection from a diffusively reflective facet that lies entirely within the beam, with adjacent facets directed so that they do not reflect back light along the beam direction.

Returning to FIG. 1, an important point to note is that, by using diffusive reflection of a plurality of collimated beams 104, 124 in different directions, 2D or 3D translation can be measured by means of reflection from a single surface part of object 14. As shown in FIG. 1, a planar surface part can be used that, but for surface roughness, has the same surface normal in the intersection with each of the collimated beams 104, 124. It suffices that the surface part has some diffusive reflection. Purely diffusive reflection is not required: the reflection properties of the surface part may also include a sharp specular reflection peak 22, but no use needs to be made of this reflection peak 22. When the collimated beam is not directed perpendicular to the surface part, the specular reflection will not affect the light received in the single mode fiber 100, 120.

In this way 2D or 3D interferometric translation measurements can be performed easily, even when only a single surface part of the object 14 is easily accessible for light beams from interferometers, or when the object is a thin plate that only has parallel surface parts. The (accessible) surface part may be a planar surface part. The collimated beams 104, 124 may overlap on the surface part, making it possible to get 2D or 3D translation measurements from a limited accessible area.

Alternatively, the collimated beams 104, 124 may be directed at differently oriented areas. This requires access to a greater part of the object, but it also makes it possible to use the effect that the combination of the collimator, the single mode fiber and diffuse reflection substantially makes the interferometric signal dependent only on translation in the beam direction to separate the effect of different translation components.

Preferably, the same type of interferometer may be used in each of the interferometers, but it is possible to use different types. Any known type of interferometer may be used to determine a time dependent phase variation of the received light that has travelled back and forth to the object, for example from periodic intensity variation of a mix of the received light and reference light in the interferometer. In an embodiment an interferometer as used in EP2236978 may be used, which uses interferometry using a 3-way coupler, which makes it possible to perform displacement measurements by calculation of the phase independent of reflection intensity variations. However, other types of interferometer may be used. FIG. 3 illustrates an embodiment using a Michelson type interferometer, comprising a light source 30, a splitter/combiner 32, a mirror 34, a photodetector 36, a single mode fiber 100, and a collimator 102. Light source 30 is coupled to splitter/combiner 32 via a first optical path. Splitter/combiner 32 is configured to split the light from light source 30 and feed the split light to mirror 34 and collimator 102 through a second and third optical path respectively. Third optical path comprises single mode fiber 100. The tip of single mode fiber 100 is located at the focal point of collimator 102. Splitter/combiner 32 is configured to combine light received from second and third optical path and to feed the combined light to photodetector 36 via a fourth light paths. An output of photodetector 36 is coupled to a computer 38. Photodetector 36 may comprise an AD converter, or an AD converter (not shown) may be coupled between photodetector 36 and computer 38. The light paths may consist of optical fibers, or extend partly or wholly through free space.

In operation split light that splitter/combiner 32 feeds to collimator 102 passes through single mode fiber 100 to collimator 102, which converts the light into a collimated beam of outgoing light that is directed to the surface part of object 14 at a non-zero angle to the normal vector of the surface part. Collimator 102 focusses light that has been diffusely reflected by object 14 on the tip single mode fiber 100, which passes the combination of reflected light to splitter/combiner 32. Splitter/combiner 32 combines reflected light from mirror 34 and the light received from object 14 to photodetector 36. Photodetector 36 converts the light into an electrical signal, which may be digitized and fed to computer 38. The intensity of the light on photodetector 36 is the result of interference between the light reflected by mirror 34 and the light received from object 14. This intensity varies periodically with translation of object 14.

Computer 38 receives signals from a plurality of interferometers (only one shown in FIG. 3) that direct collimated beams of outgoing light to the same surface part of object from different angles. From this, computer 38 computes translations in directions parallel to the collimated beams. Conversion of interference signals into translations is known per se. Computer 38 may do so for example by counting the number of periods of the variation of the detected signal during translation and/or converting signal variation within a period into sub-period translation measurements.

Computer 38 combines the translations measured using the different interferometers into 2D or 3D translation measurements. If the directions of the collimated beams are orthogonal, the translations measured using the different interferometers form orthogonal components of the 2D or 3D translation measurements, which can be used directly as measurements of 2D or 3D coordinate changes. Otherwise, known geometric computations may be used to convert measured translations along the directions of the non-orthogonal collimated beams into 2D or 3D orthogonal coordinate changes.

Although in the preceding translation measurement has been described for an object that translates but does not deform or rotate, it should be noted that, the object may be part of a larger object with other parts that may rotate or translate relative to the object, as long as the diffusive reflection is measured only from a surface or surfaces of the object that are only translated.

If, instead of a collimated beam, a focusing beam would be used, translation measurements are more difficult. Unlike the flat wave front of the collimated beam, a focusing beam has a curved phase front. In this case, the wave front can be viewed as a collection of flat wave fronts in different beam directions, which reflect from different parts of the diffusely reflective surface. When the diffusely reflective surface as a whole is translated, this results in different changes of the parts of total reflected wave vector that are due to different parts of the surface. For each surface part, there is a small noise and a phase shift in its part of the reflected wave vector, in proportional to the component of the overall translation in the direction of the local wave front direction at the surface part. This phase shift is proportional to the cosine of the angle between the local direction of the wave front at the surface part and the overall translation, and hence different for different parts of the wave front. As a result, the interference measurement of the interferometer no longer strictly depends on a single direction component of the translation and the size of the phase shift due to a same component of the translation may be different for different surface parts.

This reduces the accuracy of the measurements. For a wave front with small curvature, the phase shift of the diffusely reflected light at the reference positions is proportional to the translation component along the average of the unit vector normal to the wave front of the beam within the reflected surface (part). But the curvature gives rise to an unpredictable dependence on other translation components. For small translations and wave fronts with small curvature, this dependence is linear with unpredictable coefficients. The mean square of these coefficients is proportional to the mean square of the deviation of the unit vector from the average (strictly speaking of the correlation matrix of these deviations), using the mean over the beam width within the reflected surface (part). Making the beam or the surface part smaller so that the deviations are smaller may effectively reduce the beam to a collimated (flat wave-front) beam in the diffusively reflecting surface part. This increases the predictability, but reduces the intensity of diffuse reflection. If the curvature of the wave front is sufficiently small, the root mean square of this deviation is small and hence the noise will be small, so that reasonably accurate translation measurements are still possible.

However, in areas where the phase front is sufficiently flat on the illuminated part of the surface, the beam can effectively be regarded as a collimated beam in the sense that reasonably accurate measurements are possible, e.g. with less than 10% root mean square variation of the normal to the wave-front. The curvature of the phase front of a focusing beam changes with distance to the focal plane and depends on the focusing power of the lens. For sufficiently small translations around the focus, the relation between the phase detected by the interferometer and the displacement is approximately linear, and may be used for translation measurements.

Although an embodiment has been shown wherein none of the collimators directs collimated outgoing light perpendicularly onto the (area 140 of the) surface part, it should be realized that one of collimators may direct the outgoing light perpendicularly onto the (area 140 of the) surface part as long as the collimators that are used to measure other translation components do not. Thus the different interferometers may be used to measure movement into different directions, while one of collimators used reflection in the conventional mirror direction from the (area 140 of the) object surface part.

The interferometers are considered to be different interferometers at least when they do not share the same single mode fiber and the same collimator lens. In an embodiment, the different interferometers may share other components. For example, in an embodiment light source 30, splitter/combiner 32, mirror 34 and photodetector 36 may be shared. In this embodiment, one or more further splitter/combiners may be coupled between splitter/combiner 32 and single mode fiber 100, 120, and one or more combinations of a single mode fiber and a collimator may be coupled to the one or more further splitter/combiners respectively, to direct collimated beams to the same surface part along different angles. In this embodiment, shutters are preferably provided in series with the single mode fibers. This embodiment can be used to multiplex measurements of the rates of translation in different directions. In another example, light source 30 may be shared and the combination of the photodetector and the single mode fiber and the collimator is not shared. In this embodiment, respective combiners may be used to combine reference light with reflected light from different single mode fibers respectively and to feed the results to respective photodetectors.

The diffuse reflection from the surface part may give rise to cross-coupling of light between different interferometers, so that the photodetector 36 of one interferometer may detect a combination of reflections of light from that interferometer with reflections of light from other interferometers. This can disturb the measurements. This may be avoided by time multiplexing of measurements of the rates of translation by means of different interferometers and prevention of light emission to the collimator from each interferometer when the interferometer is not used for measurements, or at least when any of the other interferometers is used. Each interferometer may comprise an optical shutter for this purpose, or its light source may be switched off. In an alternative embodiment the disturbance may be reduced by using light different of wavelength in different interferometer, or by using relative orientations of the beams from different interferometers at which no cross-coupling occurs.

Although the effect of using a collimated beam to obtain reflection using a diffusely reflecting surface has been described, it may be noted that a similar effect may be obtained using a retro-reflective surface which can provide feed back of more optical power into the single mode fiber than diffuse reflection. A retro reflective surface contains mirror cells that each contain three mutually orthogonal mirror surfaces, i.e. specularly reflective surfaces, or retro reflective cells with other mini/micro structures e.g. glass spheres. Many identical retro-reflective cells may be present on a retro reflective surface. Unlike a diffusely reflective surface, which does not contain such cells, such a retro-reflective surface mainly reflects light back along the direction of incoming light. But when collimated beam with a beam cross-section area that encompasses a large number of such cells is used, the reflected wave vector has a similar dependence on translation as the reflected wave vector from a diffusely reflective surface. As a result translations can be measured in a similar way.

The invention claimed is:

1. A method of optically measuring translations of an object in a plurality of different spatial directions, the method comprising:
    using a plurality of interferometers, each configured to measure a respective phase response to a respective translation component of the object, from interference with a respective reflection of outgoing light transmitted to the object along a respective different spatial direction;
    wherein at least one of the interferometers comprises a single mode fiber and a collimator that are configured to:
        transmit the outgoing light to the object successively through the single mode fiber and the collimator, and
        collect a reflection into the single mode fiber with the collimator,
        wherein both transmit and collect paths are along a same beam direction, for determining the respective phase response relative to a reference in the interferometer;
    wherein the collimator expands a beam width of light from the single mode fiber and directs a collimated expanded beam of the outgoing light, that is received non-orthogonally at a surface part of the object, and
    wherein the surface part of the object is:
        a diffusely reflective surface part of the object, from which the reflection is collected, or
        a part of the object covered with a plurality of retro-reflective cells, from which the reflection is collected.

2. The method according to claim 1, wherein the collimator directs the collimated beam from said at least one of the interferometers to the same surface part of the object as at least one other of the plurality of interferometers.

3. The method according to claim 2, wherein the plurality of interferometers comprises a further interferometer that comprises a further single mode fiber and a further collimator that are configured to transmit outgoing light to the object successively through the further single mode fiber and the further collimator in a further beam direction different from said beam direction,
wherein the beam and a further beam from the further collimator are both directed to said same surface part of the object.

4. The method of claim 2, wherein said same surface part of the object is a planar surface part.

5. The method of claim 2, wherein the collimated beams of outgoing light from each of said plurality of interferometers overlap on said surface part of the object.

6. The method of claim 2, wherein said surface part of the object is a diffusely reflective patch on a non-reflective or an only specularly reflective surface of the object, and wherein a beam width of the collimated beams allows movement of the diffusely reflective patch within the beam width while the patch remains entirely within the collimated beam.

7. The method of claim 2, wherein said surface part is a facet of the object, and wherein a beam width of the collimated beams allows movement of the facet within the beam width while the facet remains entirely within the collimated beam.

8. An interferometric measuring system for measuring translations of an object, the interferometer system comprising a plurality of interferometers, where each interferometer is configured to measure a respective phase response to a respective translation component of the object, from interference with a respective reflection of outgoing light transmitted to the object along a respective different spatial direction, wherein at least one of the interferometers comprises:
a single mode fiber;
a collimator configured to:
expand a beam width of light from the single mode fiber and transmit a collimated expanded beam, of outgoing light from the single mode fiber, that is received at the object, and
collect a reflection of the outgoing light from the object into the single mode fiber; and
a photodetector configured to detect interference between the reflection collected into the single mode fiber and the reference light.

9. The interferometric measuring system according to claim 8, wherein each one of the plurality interferometers are configured to direct the outgoing light to a spatial region wherein beams from all of said interferometers overlap.

10. An interferometric measuring system according to claim 8, wherein the plurality of interferometers comprises a further interferometer,
wherein the further interferometer comprises:
a further single mode fiber,
a further collimator configured to transmit a further collimated beam of outgoing light from the further single mode fiber to the object, and
a photodetector configured to detect interference with the reflection collected into the further single mode fiber,
wherein the collimated beam and the further collimated beam have different beam directions, and
wherein the collimated beam and the further collimated beam are both directed to intersect each other.

11. The interferometric measuring system of claim 8, further comprising the object,
wherein the object has a surface part that is diffusively reflective, and
wherein the collimated beam and the further collimated beam overlap on said surface part.

12. The interferometric measuring system according to claim 8, further comprising the object, the object having a surface part that is diffusively reflective, each of the plurality of interferometers being configured to measure interference with light reflected from said surface part.

13. The interferometric measuring system of claim 11, wherein said surface part is a planar surface part.

14. The interferometric measuring system of claim 11, wherein said surface part is:
a diffusely reflective patch on a non-reflective, or
an only specularly reflective surface of the object,
wherein a beam width of the collimated beams allows movement of the patch within the beam width while the patch remains entirely within the collimated beam.

15. The interferometric measuring system of claim 11, wherein said surface part is a facet of the object, beam widths of the collimated beams allowing movement of the facet within the beam widths while the facet remains entirely within the collimated beams.

16. The interferometric measuring system of claim 8, wherein respective ones of the plurality of interferometers comprise light sources for producing at least one of the group consisting of:
light in respective different wavelength bands, and
monochromatic light at respective different wavelengths.

17. The interferometric measuring system of claim 8 wherein the collimated expanded beam is transmitted directly from the collimator at the object.

18. The method of claim 1 wherein the collimated expanded beam is transmitted directly from the collimator at the surface part of the object.

* * * * *